(12) United States Patent
Yang et al.

(10) Patent No.: US 9,964,820 B2
(45) Date of Patent: May 8, 2018

(54) DISPLAYS WITH FLIPPED PANEL STRUCTURES

(71) Applicant: Apple Inc., Cupertino, CA (US)

(72) Inventors: Byung Duk Yang, Cupertino, CA (US); Kyung-Wook Kim, Cupertino, CA (US); Shih-Chang Chang, Cupertino, CA (US); Hiroshi Osawa, Sunnyvale, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 14/491,248

(22) Filed: Sep. 19, 2014

(65) Prior Publication Data

US 2015/0219972 A1    Aug. 6, 2015

Related U.S. Application Data

(60) Provisional application No. 61/935,734, filed on Feb. 4, 2014.

(51) Int. Cl.
*G02F 1/1335* (2006.01)
*G02F 1/1362* (2006.01)
*G02F 1/1333* (2006.01)

(52) U.S. Cl.
CPC ............... *G02F 1/136209* (2013.01); *G02F 2001/133357* (2013.01); *G02F 2001/136222* (2013.01)

(58) Field of Classification Search
CPC ............. G02F 1/136209; G02F 1/1368; G02F 1/133602; G02F 2001/136222; G02F 2001/133357
USPC .................................................. 349/106–109
See application file for complete search history.

(56) References Cited

U.S. PATENT DOCUMENTS

| | | | |
|---|---|---|---|
| 6,559,913 B1 * | 5/2003 | Sera ................... | G02F 1/136209 349/111 |
| 6,717,638 B1 * | 4/2004 | Kim ................... | G02F 1/133514 349/106 |
| 7,595,137 B2 | 9/2009 | Denda et al. | |
| 8,772,799 B2 | 7/2014 | Kang et al. | |
| 8,785,088 B2 | 7/2014 | Takasaki et al. | |
| 2005/0088596 A1 * | 4/2005 | Shimizu ............... | G02F 1/1362 349/139 |
| 2008/0123039 A1 * | 5/2008 | Lee .................... | G02F 1/133345 349/139 |

(Continued)

*Primary Examiner* — Charles Chang
(74) *Attorney, Agent, or Firm* — Treyz Law Group, P.C.; Jason Tsai

(57) ABSTRACT

A display may have a thin-film transistor layer and a color filter layer. The display may include light blocking structures formed on a transparent substrate. In one arrangement, a clear planarization layer may be formed over the light blocking structures. The thin-film transistor layer may be formed over the planarization layer. The color filter layer may be integrated with the thin-film transistor layer. At least light blocking structures and the planarization layer should be formed from high temperature resistance material. In another arrangement, the color filter layer may be formed on the light blocking structures. A clear planarization layer may then be formed over the color filter layer. The thin-film transistor layer may be formed on the planarization layer. In this arrangement, the color filter layer also needs to be formed from thermal resistance material.

15 Claims, 8 Drawing Sheets

(56) References Cited

U.S. PATENT DOCUMENTS

| | | | |
|---|---|---|---|
| 2008/0259263 A1* | 10/2008 | Cho | G02F 1/133707 349/142 |
| 2009/0174835 A1* | 7/2009 | Lee | G02F 1/1368 349/46 |
| 2010/0243970 A1 | 9/2010 | Toshimitsu et al. | |
| 2011/0031517 A1* | 2/2011 | Huang | H01L 29/78633 257/98 |
| 2014/0151708 A1* | 6/2014 | Jeon | H01L 29/66969 257/72 |
| 2014/0184973 A1* | 7/2014 | Kim | G02F 1/136209 349/43 |
| 2014/0240645 A1 | 8/2014 | Shim et al. | |

* cited by examiner

DISPLAYS WITH FLIPPED PANEL STRUCTURES

This application claims the benefit of provisional patent application No. 61/935,734, filed Feb. 4, 2014, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

A display such as a liquid crystal display has an active area filled with an array of display pixels. The active area is surrounded by an inactive border area. It may be desirable to minimize or eliminate the use of unsightly bezel structures in the inactive border area. In displays with small bezels or no bezels, there is a risk that backlight can leak through the inactive border area. If care is not taken, stray backlight will undesirably lighten the inactive area.

It would therefore be desirable to be able to provide improved light blocking structures in displays such as liquid crystal displays.

SUMMARY

An electronic device having a liquid crystal display (LCD) is provided. The liquid crystal display may include display pixel circuitry formed on a glass substrate. Light blocking structures such as black masking material may be patterned on the glass substrate to prevent stray light from propagating in undesired directions.

In one suitable arrangement, a planarization layer may be formed on the glass substrate over the light blocking structures. Thin film transistor structures such as thin-film transistors and associated pixel electrodes may be formed over the planarization layer. A color filter layer may be interposed between the thin-film transistors and the pixel electrodes (e.g., color filter elements may be integrated with the thin-film transistor structures). If desired, additional light blocking structures may be embedded with the color filter layer (e.g., additional light blocking structures may be formed directly on respective color filter elements). Liquid crystal material may be formed over the color filter layer. Formed in this way, at least the light blocking structures formed on the glass substrate and the planarization layer may be formed from high temperature resistant material (e.g., material that can withstand temperatures of at least 300° C. without degrading).

Display circuitry of this type may be assembled in a flipped orientation. Configured in the flipped orientation, a backlight unit in the LCD display may emit backlight that travels through the liquid crystal material, the color filter layer, the thin-film transistor structures, the planarization layer, and the glass substrate in that order to a user of the electronic device.

In another suitable arrangement, a color filter array may be formed directly on the glass substrate over the light blocking structures. A planarization layer may be formed on the color filter array. A thin-film transistor (TFT) layer may then be formed on the planarization layer. If desired, additional light blocking structures may be embedded within the thin-film transistor layer (e.g., additional black mask material may be formed directly on one or more dielectric layers directly above thin-film transistors in the TFT layer). Liquid crystal material may be formed over the thin-film transistor layer. Formed in this way, at least the light blocking structures formed on the glass substrate, the color filter array, and the planarization layer may be formed from high thermal resistant material (e.g., material that can withstand temperatures of at least 300° C. without degradation).

Display circuitry of this type may also be assembled in a flipped orientation. Configured in the flipped/inverted orientation, a backlight unit in the LCD display may emit backlight that travels through the liquid crystal material, the thin-film transistor layer, the planarization layer, the color filter array, and the glass substrate in that order to a user of the electronic device.

Further features of the present invention, its nature and various advantages will be more apparent from the accompanying drawings and the following detailed description.

DETAILED DESCRIPTION

Illustrative electronic devices of the types that may be provided with displays are shown in FIGS. 1, 2, 3, and 4.

Figure 1:
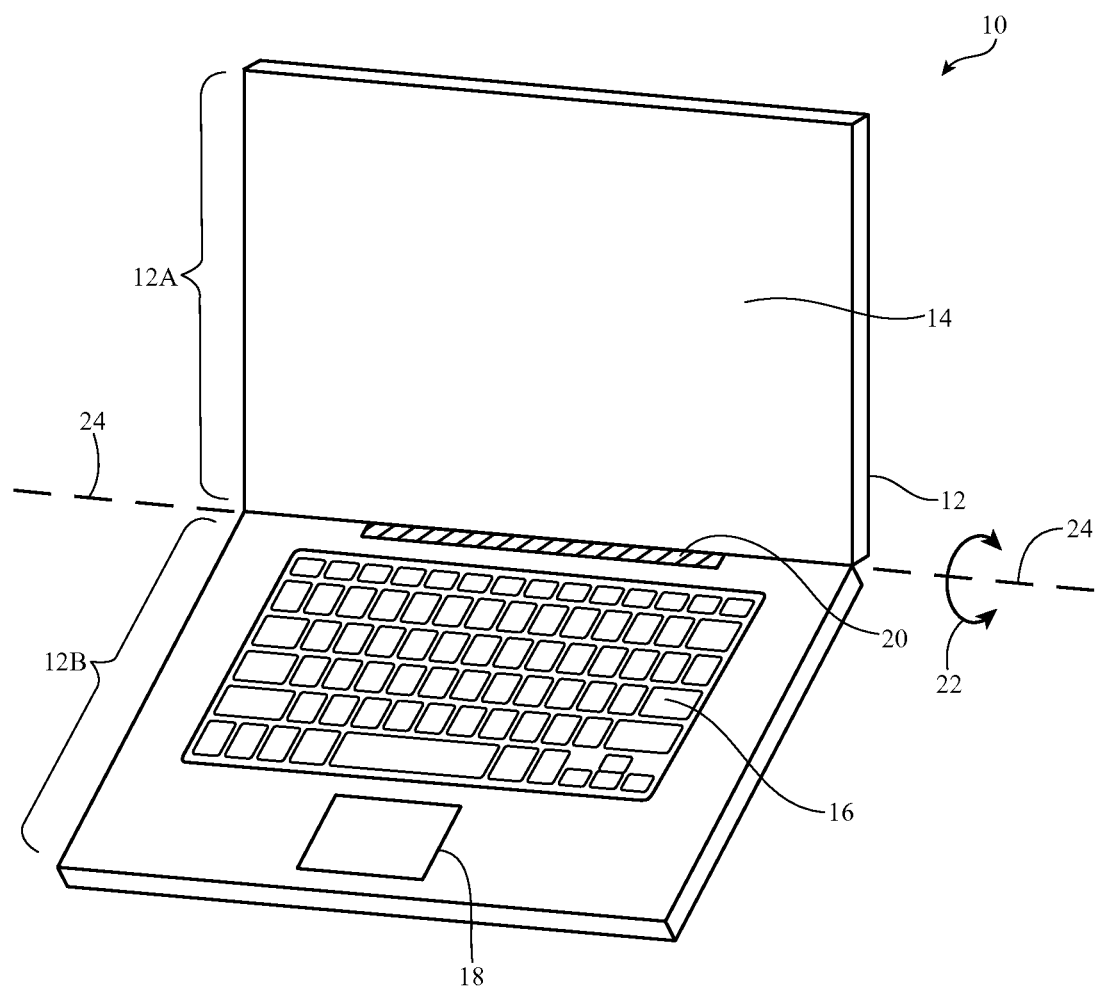
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
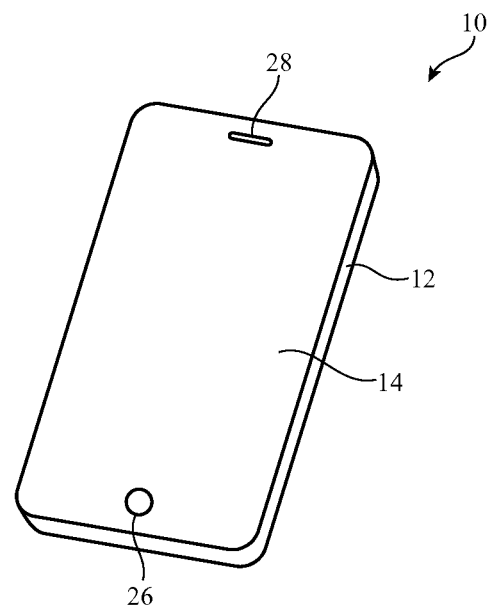
FIG. 2 is a perspective view of an illustrative electronic device such as a handheld electronic device with a display in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
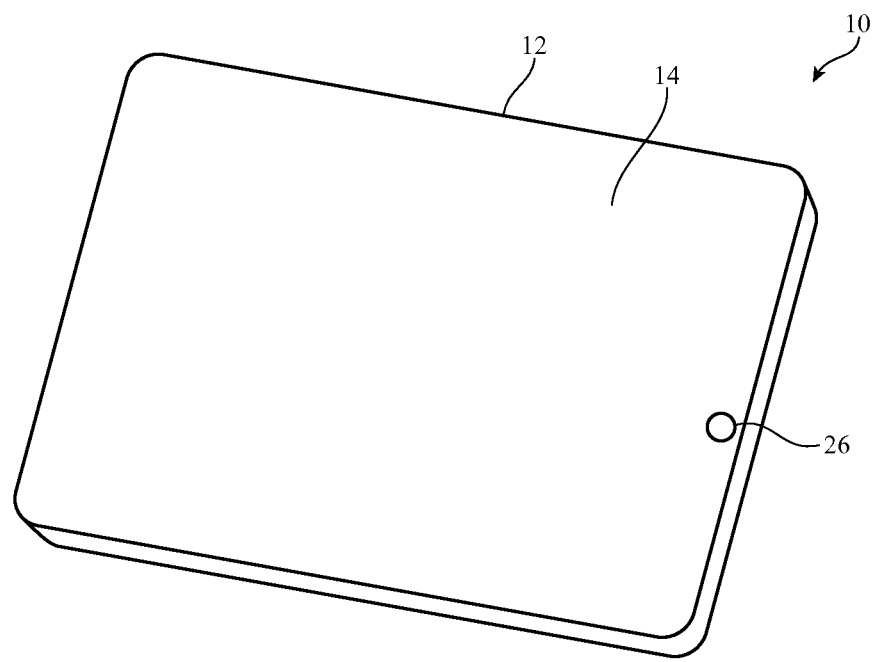
FIG. 3 is a perspective view of an illustrative electronic device such as a tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
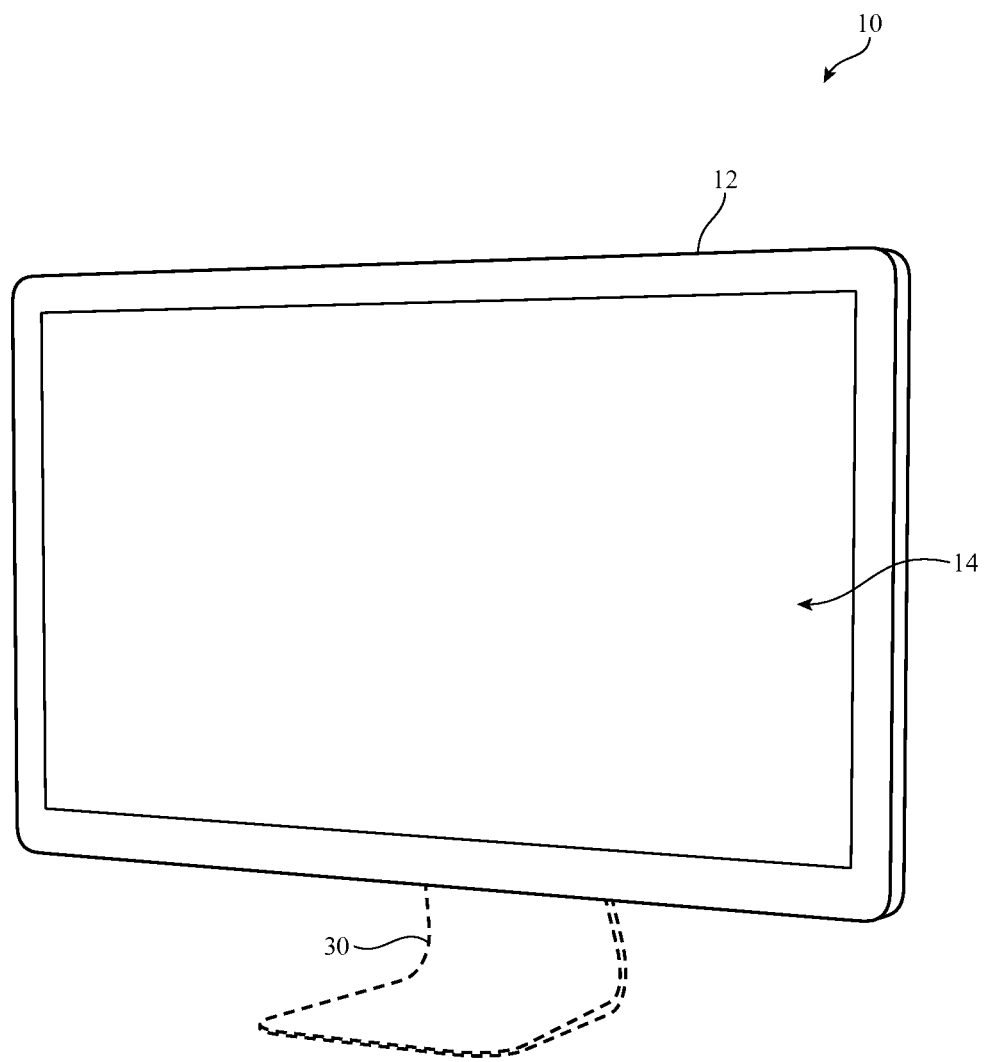
FIG. 4 is a perspective view of an illustrative electronic device such as a display for a computer or television with a display in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table or desk.

Figure 5:
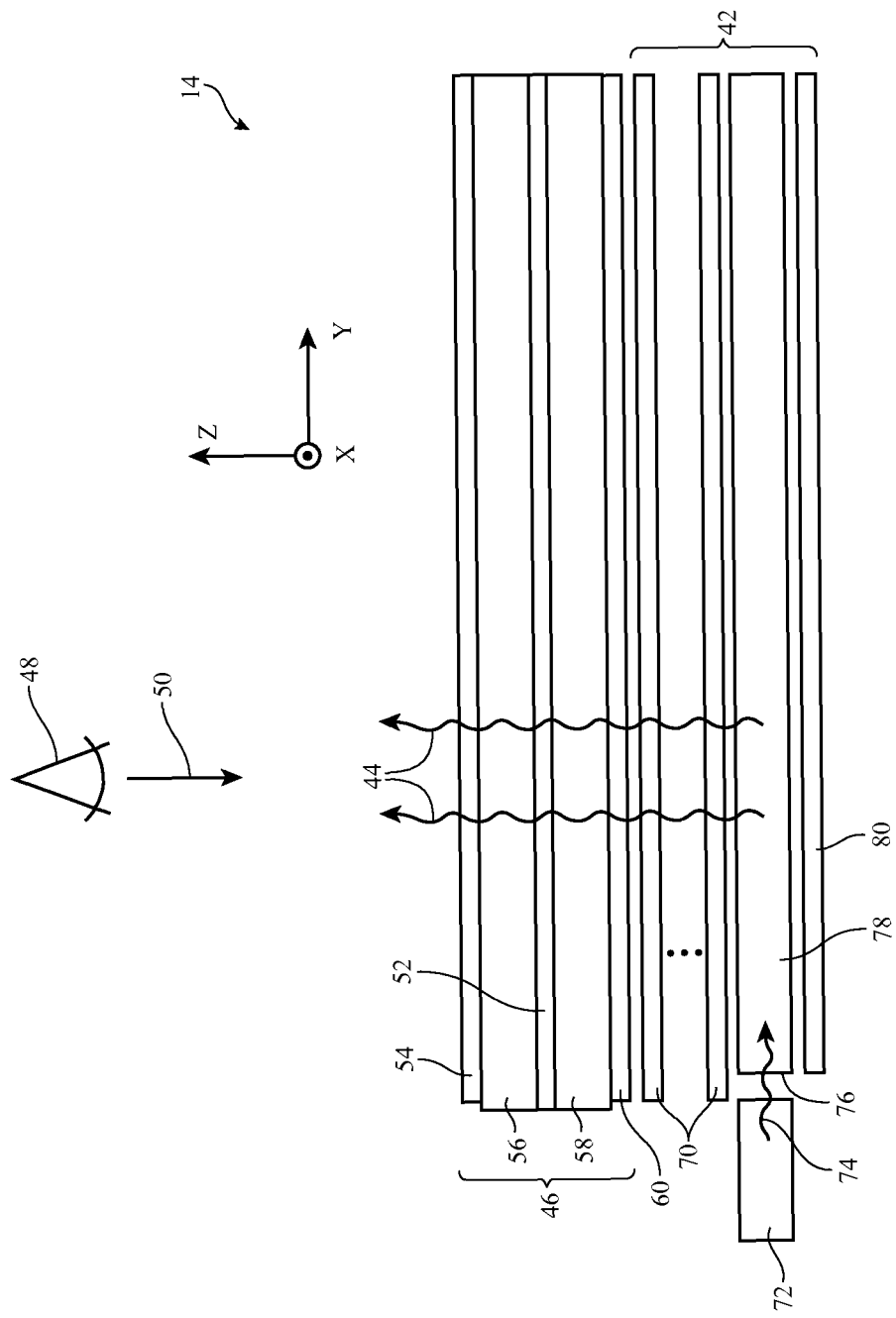
FIG. 5 is a cross-sectional side view of an illustrative display in accordance with an embodiment.

Display 14 may be a liquid crystal display or a display formed using other suitable display technologies. A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion of housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, outer substrate layer 56 may be a thin-film transistor layer that includes an array of thin-film transistors and associated electrodes (display pixel electrodes) for applying electric fields to liquid crystal layer 52 and thereby displaying images on display 14. Inner substrate layer 58 may be a color filter layer that includes an array of color filter elements for providing display 14 with the ability to display color images.

In another suitable arrangement, inner substrate layer 58 may be a thin-film transistor layer that includes an array of thin-film transistors and associated electrodes (display pixel electrodes) for applying electric fields to liquid crystal layer 52, whereas outer substrate layer 56 may be a color filter layer that includes an array of color filter elements for providing display 14 with the ability to display color images.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Display 14 may have an array of display pixels (e.g., a rectangular array having rows and columns) for displaying images to a viewer. Vertical signal lines called data lines may be used to carry display data to respective columns of display pixels. Horizontal signal lines called gate lines may be used to carry gate line signals (sometimes referred to as gate control signals or gate signals) to respective rows of display pixels. The outline of the array of display pixels in display 14 defines an active area for display 14. The active area may have a rectangular shape and may be surrounded by an inactive border region. An inactive border area may, for example, run along one edge, two edges, three edges, or all four edges of the active area.

Figure 6:
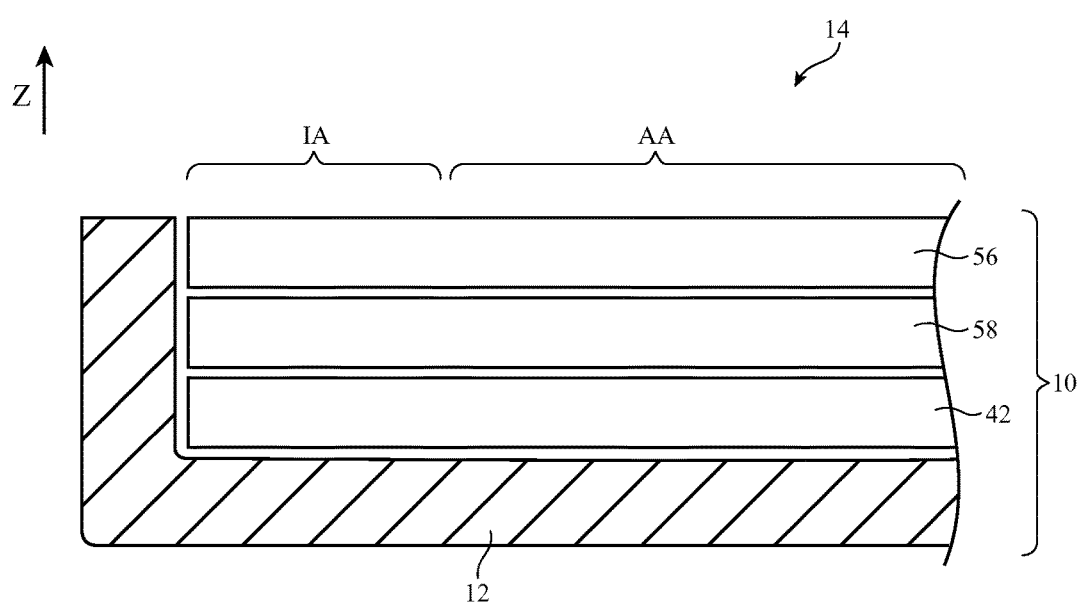
FIG. 6 is a cross-sectional side view of a portion of an illustrative electronic device showing how an edge of a display in the device may be free of overlapping housing structures in accordance with an embodiment.

A cross-sectional side view of an illustrative electronic device having a display such as display 14 of FIG. 5 is shown in FIG. 6. As shown in FIG. 6, images may be displayed on central active area AA of display 14. Inactive area IA may have a rectangular ring shape that runs around the rectangular periphery of active area AA. To avoid unsightly bezel structures in device 10, it may be desirable to keep inactive area IA free of overlapping housing structures, bezels, or other potentially unattractive border structures.

To avoid light leakage in inactive area IA (e.g., to prevent stray light from escaping in the absence of a bezel or other overlapping structure), display 14 may be provided with border masking structures in inactive area IA. The border masking structures may help block stray backlight from backlight unit 42 and thereby ensure that border IA does not allow excess light to escape. Backlight from backlight unit 42 will therefore be confined to active area AA.

To provide satisfactory light blocking capabilities, light blocking structures can be formed in two parts (e.g., two layers). A first part of the light blocking structures may be formed from a black masking layer on the underside of thin-film transistor layer 56. The black masking layer may be patterned to form a black mask. The black mask is a grid-shaped series of intersecting black lines that define a rectangular array of clear display pixel openings in the thin-film transistor layer. Each of the openings in the black mask is aligned with a respective color filter element in a corresponding array of color filter elements on color filter layer 58. The grid-shaped black mask on the thin-film transistor layer may sometimes be referred to as a black matrix. A second part of the light blocking structures may be formed from opaque structures that are integrated with color filter layer 58. The first and second parts of the light blocking structures may be at least partly overlapping to ensure that light emitted from each image pixel does not leak into undesired regions on the display (e.g., to ensure that the light associated with a given display pixel does not leak into an adjacent pixel location or into the inactive area).

Figure 7:
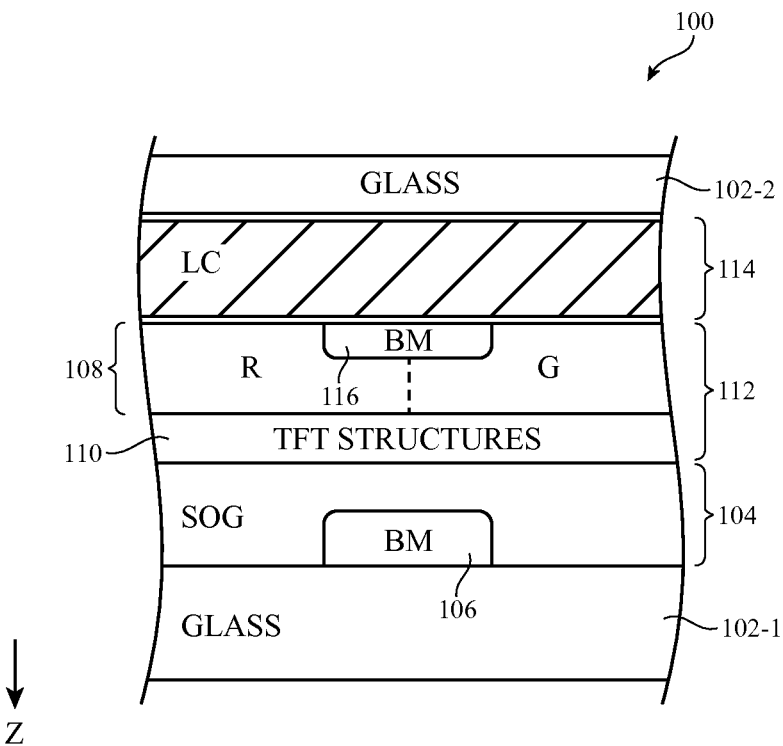
FIG. 7 is a cross-sectional side view of display circuitry having color filter elements interposed between thin-film transistor structures and liquid crystal material in accordance with an embodiment.

FIG. 7 shows a cross-sectional side view of illustrative display circuitry 100 that can be formed as part of device 10. As shown in FIG. 7, display circuitry 100 may include a first transparent substrate such as substrate 102-1. Substrate 102-1 may be formed from a clear planar structure such as a sheet of transparent plastic, transparent glass, or other clear substrate layer. Black masking layer 106 may be patterned to form part of a black matrix in active area AA of the display and may be patterned to form part of a light-blocking black mask border in inactive area IA.

Black masking material 106 may be formed from a photoimageable material such as black photoresist. The black photoresist may be formed from a polymer such as polyimide. To withstand the elevated temperatures involved in subsequent thin-film transistor fabrication steps, the polymer that is used in forming black masking material 106 preferably can withstand elevated temperatures (e.g., temperatures of 350° C. or higher or other suitable elevated temperatures). Opaque filler materials such as carbon black and/or titanium black may be incorporated into the polyimide or other polymer of layer 106 so that layer 106 is opaque.

Planarization layer 104 is used to planarize black masking layer 106 so that thin-film transistor circuitry 106 can be formed over black masking layer 106 (e.g., so that thin-film transistors can overlap black mask 106). As an example, planarization layer 104 is formed from a black mask compatible material having a low dielectric constant such as a spin-on glass (SOG). For example, planarization layer 104 may be formed from a spin-on glass such as a silicon oxide based spin-on glass (e.g., a silicate spin-on glass). During thin-film transistor formation, the structures of FIG. 7 may be subjected to elevated processing temperatures (e.g., temperatures of 350° C. or higher). Polyimide black mask layer 106 and spin-on glass planarization layer 104 are preferably able to withstand processing at these elevated temperatures (i.e., spin-on glass layer 104 will not experience diminished transparency and polyimide layer 106 will not degrade).

Thin-film transistor (TFT) structures 110 may be formed on planarization layer 104. For example, one or more thin-film transistors and/or transistors associated with gate driver circuitry may be formed on planarization layer 104 as part of layer 110. As described above, it may be desirable to form the thin-film transistors at locations overlapping with black masking layer 106. In general, regions in layer 110 that are not overlapping with any black mask material 106 should be devoid of thin-film transistors.

An array of color filter elements 108 may be formed over the TFT structures 110. Color filter elements 108 may include red color filter elements R, blue color filter elements B, and green color filter elements G. Color filter elements 108 may be formed from low-k colored photoimageable polymers. In other words, color filter elements 108 may be formed from organic material having a dielectric constant K less than that of silicon dioxide. The use of low-k color filter elements eliminates the need for an additional clear overcoat layer to be disposed directly on the thin-film transistors, which can help improve backlight transmittance.

Each color filter element 108 in the array of color filter elements may be laterally aligned with a respective opening in the array of openings in the black matrix formed from material 106 within the planarization layer 104 (e.g., each display pixel in the display may have a transparent opening, an associated display pixel electrode, and an associated aligned color filter element 108 through which backlight can pass). In the example of FIG. 7, black mask material 116 may also be embedded within the array of color filter elements 108. Black mask material 116 may be at least partially aligned with black mask material 106.

Color filter elements 108 formed in this way may be considered to be integrated with the thin-film transistor structures. Configured in this way, color filter elements 108 merely serve as one of the dielectric layers that are formed over the thin-film transistors. Other display pixel structures such as the pixel electrode, the common electrode, and other pixel interconnect routing structure can actually be formed over color filter elements 108. Integrating the color filter elements with the formation of the thin-film transistors enables both the thin-film transistor structures and the color filter elements to be manufacturing at the same fabrication facility without the need for an additional color filter to TFT assembly process. Moreover, the required width of black mask material 116 can also be reduced, since the distance between materials 106 and 116 is minimized by forming the color filter elements directly on the thin-film transistors.

This arrangement in which the color filter elements are integrated with the thin-film transistor layer is sometimes referred to as the color-filter-on-array or "COA" configuration. The thin-film transistor structures 110 and the integrated color filter elements 108 may therefore sometimes be referred to collectively as a COA layer 112. Still referring to FIG. 7, liquid crystal (LC) material 114 may be formed on COA layer 112. A second transparent substrate such as substrate 102-2 (e.g., a sheet of transparent plastic, transparent glass, or other clear substrate layer) may be formed over the liquid crystal material 114.

The orientation of circuitry 100 in FIG. 7 is actually inverted for illustrative purposes. During operation of device 10, the backlight travels in direction Z and passes through display pixel structures and color filter elements in circuitry 100. From a users perspective (e.g., FIG. 5 a user 48 that looks at display 14 from the top), the COA layer is formed over the liquid crystal material 114 (i.e., the color filter elements 108 are formed over LC material 114, whereas the thin-film transistors are formed over the color filter elements 108). Display circuitry 100 oriented in this way may sometimes be referred to as a flip-over display panel or a flipped TFT panel (sometimes abbreviated as FTP).

Figure 8:
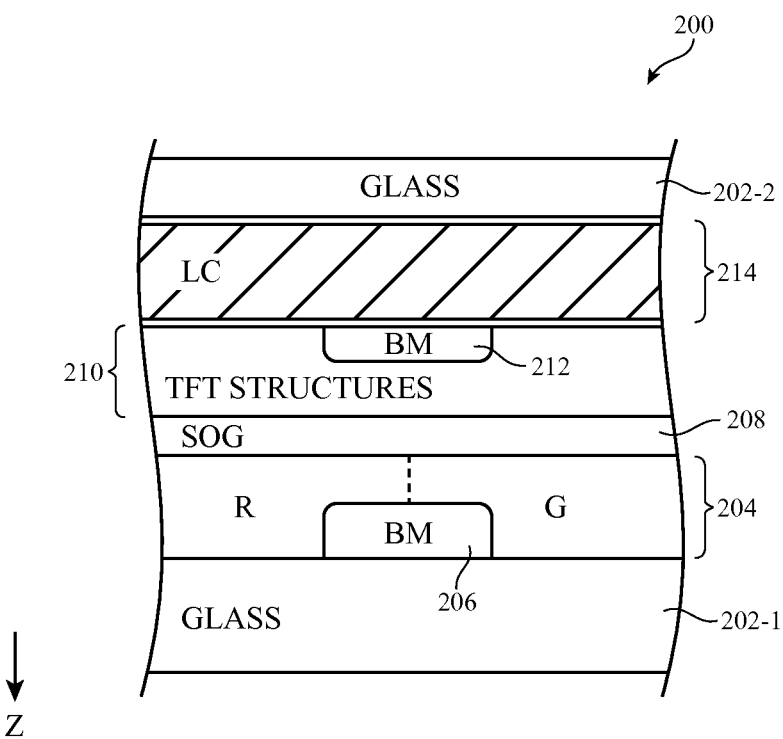
FIG. 8 is a cross-sectional side view of display circuitry having thin-film transistor structures interposed between liquid crystal material and color filter elements in accordance with an embodiment.

The example of FIG. 7 in which the color filter elements are interposed between the liquid crystal material and the thin-film transistors is merely illustrative and does not serve to limit the scope of the present invention. FIG. 8 shows another suitable arrangement in which the thin-film transistors are interposed between the liquid crystal material and the color filter elements. As shown in FIG. 8, display circuitry such as display circuitry 200 may include a first transparent substrate such as substrate 202-1. Substrate 202-1 may be formed from a clear planar structure such as a sheet of transparent plastic, transparent glass, or other clear substrate layer. Black masking layer 206 may be patterned to form part of a black matrix in active area AA of the display and may be patterned to form part of a light-blocking black mask border in inactive area IA.

Black masking material 206 may be formed from a photoimageable material such as black photoresist (e.g., polyimide). To withstand the elevated temperatures involved in subsequent thin-film transistor fabrication steps, the polymer that is used in forming black masking material 206 preferably can withstand elevated temperatures (e.g., temperatures of 300° C. or higher or other suitable elevated temperatures). Opaque filler materials such as carbon black and/or titanium black may be incorporated into the polyimide or other polymer of layer 206 so that layer 206 is opaque.

In particular, an array of color filter elements 208 may be formed on substrate 202-1 over black masking material 206. Color filter elements 208 may include red color filter elements R, blue color filter elements B, and green color filter elements G. Color filter elements 208 may be formed from colored photoimageable polymers.

Planarization layer 208 is used to planarize color filter elements 204 so that thin-film transistor circuitry 210 can be formed over color filter layer 204 (e.g., so that thin-film transistors can overlap black mask 206). As an example, planarization layer 204 is formed from a black mask compatible material having a low dielectric constant such as a spin-on glass (SOG). For example, planarization layer 204 may be formed from a spin-on glass such as a silicon oxide based spin-on glass (e.g., a silicate spin-on glass). During thin-film transistor formation, the structures of FIG. 8 may be subjected to elevated processing temperatures (e.g., temperatures of 350° C. or higher). Polyimide black mask layer 206, color filter elements 204, and spin-on glass planarization layer 208 are preferably able to withstand processing at these elevated temperatures (i.e., spin-on glass layer 208 will not experience diminished transparency, and color filter elements 204 and polyimide layer 206 will not degrade).

Thin-film transistor (TFT) structures 210 may be formed on planarization layer 208. For example, one or more thin-film transistors and/or transistors associated with gate driver circuitry may be formed on planarization layer 208 as part of layer 210. As described above, it may be desirable to form the thin-film transistors at locations overlapping with black masking layer 206. In general, regions in layer 210 that are not overlapping with any black mask material 206 should be devoid of thin-film transistors and should be laterally aligned with a respective opening in the array of openings in the black matrix formed from material 206 and with each respective color filter element 204.

In the example of FIG. 8, black mask material 212 may also be embedded within the TFT layer 210. Black mask material 212 may be at least partially aligned with black mask material 206. The required width of black mask material 212 can be minimized by reducing the distance between materials 206 and 212 (e.g., by forming the black mask material 212 on dielectric layers relatively close to the thin-film transistors).

Forming display circuitry 200 in this way allows the thin-film transistor layer and the color filter array to be manufacturing at the same fabrication facility without the need for an additional color filter to TFT assembly process. This arrangement in which the thin-film transistor layer is formed on the color filter layer is sometimes referred to as the array-on-color-filter or "AOC" configuration. Still referring to FIG. 8, liquid crystal (LC) material 214 may be formed on TFT layer 210. A second transparent substrate such as substrate 202-2 (e.g., a sheet of transparent plastic, transparent glass, or other clear substrate layer) may be formed over the liquid crystal material 214.

The orientation of circuitry 200 in FIG. 8 is actually flipped for illustrative purposes. During operation of device 10, the backlight travels in direction Z and passes through display pixel structures and color filter elements in circuitry 200. From a users perspective (e.g., FIG. 5 a user 48 that looks at display 14 from the top), the color filter elements 204 are formed over the thin-film transistors, whereas the thin-film transistors are formed over the LC material 214. Display circuitry 200 oriented in this way may also be considered an FTP display.

Figure 9:
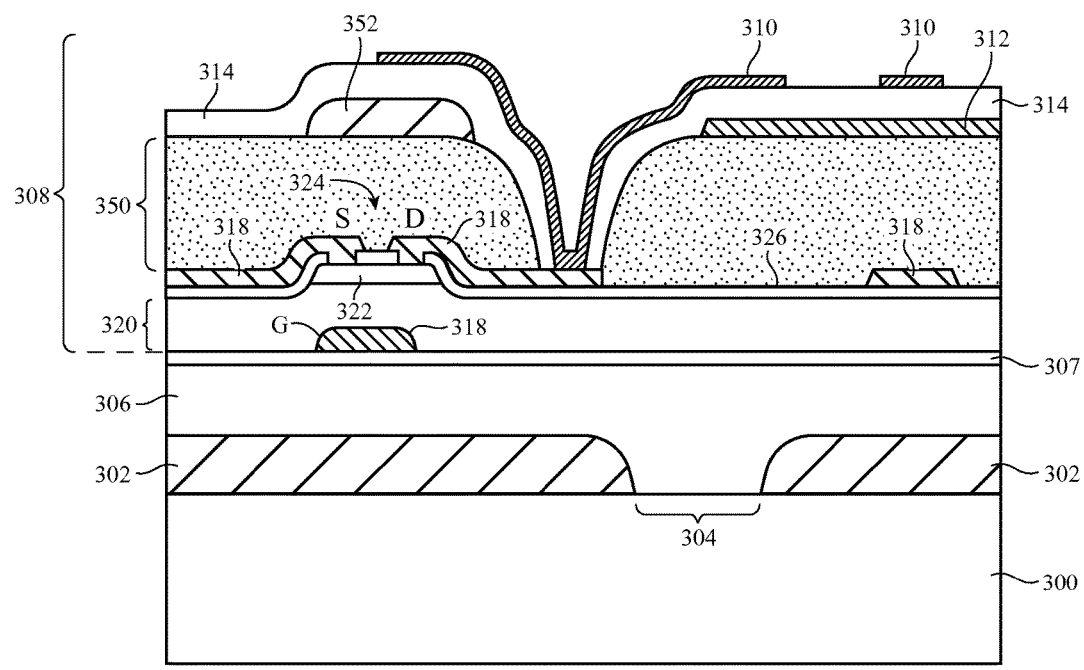
FIG. 9 is a more detailed view of the display circuitry of FIG. 7 in accordance with an embodiment.

FIG. 9 shows a more detailed cross-sectional side view of display circuitry 100 described in connection with FIG. 7. As shown in FIG. 9, display circuitry 100 may include a transparent thin-film transistor substrate such as substrate 300 (similar to substrate 102-1 of FIG. 7). Substrate 300 may be formed from a clear planar structure such as a sheet of transparent plastic, transparent glass, or other clear substrate layer. Black masking layer 302 may be patterned to form a black matrix in active area AA of display 14 and may be patterned to form part of a light-blocking black mask border in inactive area IA.

As shown in FIG. 9, black masking layer 302 may be patterned to form display pixel openings such as opening 304 that are aligned with patterned display pixel electrodes 310. Electrodes 310 may be separated from common electrode (Vcom) trace 312 by dielectric layer 314. Color filter element material 350 may be formed on top of thin-film transistor 324 from a photoimageable polymer or other dielectric (e.g., a color filter layer may be interposed between thin-film transistor 324 and associated electrodes 310). Additional black masking material 352 (similar to BM material 116 in FIG. 7) may be formed on top of color filter layer 350 directly over transistor 324.

Patterned metal 318 may be used to form transistor terminals such as source S, drain D, and gate G. Gate insulator 320 may be formed from dielectric materials such as silicon nitride and/or silicon oxide and may separate gate G from semiconductor region 322. Semiconductor region 322, which is used in forming the channel region for thin-film transistor 324, may be formed from semiconductor materials such as amorphous silicon, polysilicon, indium gallium zinc oxide, or other semiconductors. Passivation layer 326 may be formed on top of gate insulator 320.

As described above in connection with FIG. 7, black masking material 302 may be formed from a photoimageable material such as black photoresist (e.g., polyimide). Planarization layer 306 (e.g., a spin-on glass layer) may be used to planarize black masking layer 302. During thin-film transistor formation, the structures of FIG. 9 may be subjected to elevated processing temperatures (e.g., temperatures of 350° C. or higher). Polyimide black mask layer 302 and spin-on glass planarization layer 306 are preferably able to withstand processing at these elevated temperatures (i.e., spin-on glass layer 306 will not experience diminished transparency and polyimide layer 302 will not degrade).

In some embodiments, a buffer layer such as inorganic buffer layer 307 may be formed at the interface between planarization layer 306 and TFT layer 308. Buffer layer 307 may be a thin layer of silicon nitride, silicon oxide, and/or other inorganic materials having a thickness of 250-3000 angstroms (as an example). Formed in this way, inorganic buffer layer 307 may serve to prevent chemicals such as etching solution from being injected into spin-on glass planarization layer 306 during formation of the TFT circuitry in layer 308.

Figure 10:
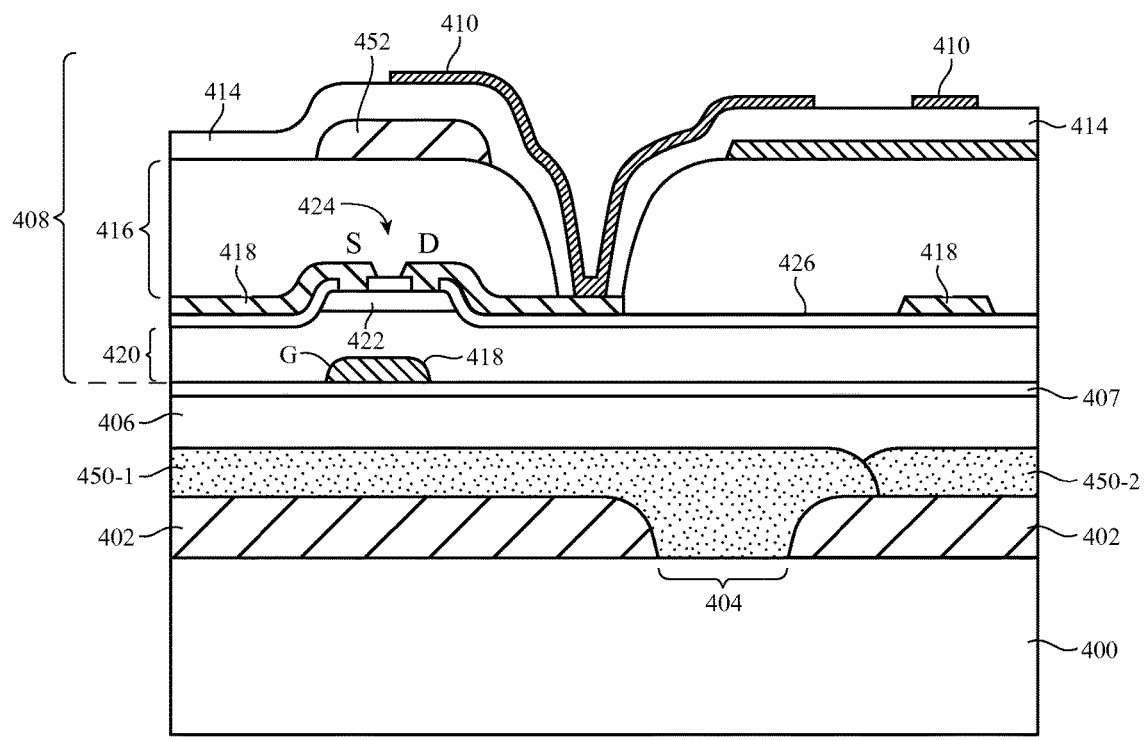
FIG. 10 is a more detailed view of the display circuitry of FIG. 8 in accordance with an embodiment.

FIG. 10 shows a more detailed cross-sectional side view of display circuitry 200 described in connection with FIG. 8. As shown in FIG. 10, display circuitry 200 may include a transparent thin-film transistor substrate such as substrate 400 (similar to substrate 102-1 of FIG. 8). Substrate 400 may be formed from a clear planar structure such as a sheet of transparent plastic, transparent glass, or other clear substrate layer. Black masking layer 402 may be patterned to form a black matrix in active area AA of display 14 and may be patterned to form part of a light-blocking black mask border in inactive area IA.

As shown in FIG. 10, black masking layer 402 may be patterned to form display pixel openings such as opening 404 that are aligned with patterned display pixel electrodes 410. Electrodes 410 may be separated from common electrode (Vcom) trace 412 by dielectric layer 414. Dielectric material 416 may be formed on top of thin-film transistor 424 from a photoimageable polymer or other dielectric. Additional black masking material 452 (similar to BM material 212 in FIG. 8) may be formed on top of dielectric material 416 directly over transistor 424.

Patterned metal 418 may be used to form transistor terminals such as source S, drain D, and gate G. Gate insulator 420 may be formed from dielectric materials such as silicon nitride and/or silicon oxide and may separate gate G from semiconductor region 422. Semiconductor region 422, which is used in forming the channel region for thin-film transistor 424, may be formed from semiconductor materials such as amorphous silicon, polysilicon, indium gallium zinc oxide, or other semiconductors. Passivation layer 426 may be formed on top of gate insulator 420.

As described above in connection with FIG. 8, black masking material 402 may be formed from a photoimageable material such as black photoresist (e.g., polyimide). Color filter material 450 (e.g., a first color filter element 450-1 of a first color, a second color filter element of a second color that is different than the first color, etc.) may be formed over black masking material 402. Planarization layer 406 (e.g., a spin-on glass layer) may be used to planarize color filter layer 450. In other words, the color filter layer may be interposed between the TFT layer and light blocking structures 402.

During thin-film transistor formation, the structures of FIG. 10 may be subjected to elevated processing temperatures (e.g., temperatures of 350° C. or higher). Polyimide black mask layer 402, color filter array 450, and spin-on glass planarization layer 406 are preferably high thermal resistant material that is able to withstand processing at these elevated temperatures.

In some embodiments, a buffer layer such as inorganic buffer layer 407 may be formed at the interface between planarization layer 406 and TFT layer 408. Buffer layer 407 may be a thin layer of silicon nitride, silicon oxide, and/or other inorganic materials having a thickness of 250-3000 angstroms (as an example). Formed in this way, inorganic buffer layer 407 may serve to prevent chemicals such as etching solution from being injected into spin-on glass planarization layer 406 during formation of the TFT circuitry in layer 408.

The foregoing is merely illustrative of the principles of this invention and various modifications can be made by those skilled in the art without departing from the scope and spirit of the invention. The foregoing embodiments may be implemented individually or in any combination.

What is claimed is:

1. Display circuitry, comprising:
   a transparent substrate;
   light blocking structures formed on the transparent substrate;
   a display pixel having a thin-film transistor coupled to associated pixel electrodes, wherein the display pixel is formed over the light blocking structures, and wherein the thin-film transistor has a bottom gate;
   color filter structures interposed between the thin-film transistor and the pixel electrodes; and
   additional light blocking structures formed over the color filter structures.

2. The display circuitry defined in claim 1, wherein the light blocking structures comprise a patterned black masking layer formed on the transparent substrate.

3. The display circuitry defined in claim 1, wherein the color filter layer is formed from low-k color filter material.

4. The display circuitry defined in claim 1, further comprising:
   a planarization layer that is formed on the transparent substrate and that is interposed between the light blocking structures and the thin-film transistor.

5. The display circuitry defined in claim 4, wherein the light blocking structures and the planarization layer are formed from material able to withstand at least 350° C. without degrading.

6. The display circuitry defined in claim 1, wherein the light blocking structures comprise high temperature resistant material.

7. The display circuitry defined in claim 1, further comprising:
   liquid crystal material formed over the pixel electrodes.

8. The display circuitry defined in claim 1, wherein the light blocking structures comprises black masking material.

9. The display circuitry defined in claim 8, wherein the black masking material comprises black photoresist.

10. An electronic device, comprising:
    a transparent substrate;
    light blocking structures formed on the transparent substrate;
    liquid crystal material;
    color filter elements interposed between the liquid crystal material and the light blocking structures, wherein the color filter elements and the light blocking structures are formed in different layers; and
    a backlight unit that emits backlight, wherein the emitted backlight travels through the color filter elements before travelling through the transparent substrate.

11. The electronic device defined in claim 10, wherein the emitted backlight travels through the liquid crystal material before travelling through the color filter elements.

12. The electronic device defined in claim 10, further comprising:
    a thin-film transistor that is interposed between the color filter elements and the light blocking structures.

13. The electronic device defined in claim 10, further comprising:

a thin-film transistor layer that is interposed between the color filter elements and the liquid crystal material.

14. The electronic device defined in claim 13, wherein the emitted backlight travels through the thin-film transistor layer before travelling through the color filter elements.

15. The electronic device defined in claim 10, further comprising:

additional light blocking structures that are formed between the transparent substrate and the liquid crystal material and that are at least partially overlapping with the light blocking structures formed on the transparent substrate.

* * * * *